Sept. 9, 1941.　　　　J. PHALEN　　　　2,255,185
HOG HOUSE
Filed Nov. 26, 1938　　　　2 Sheets-Sheet 1
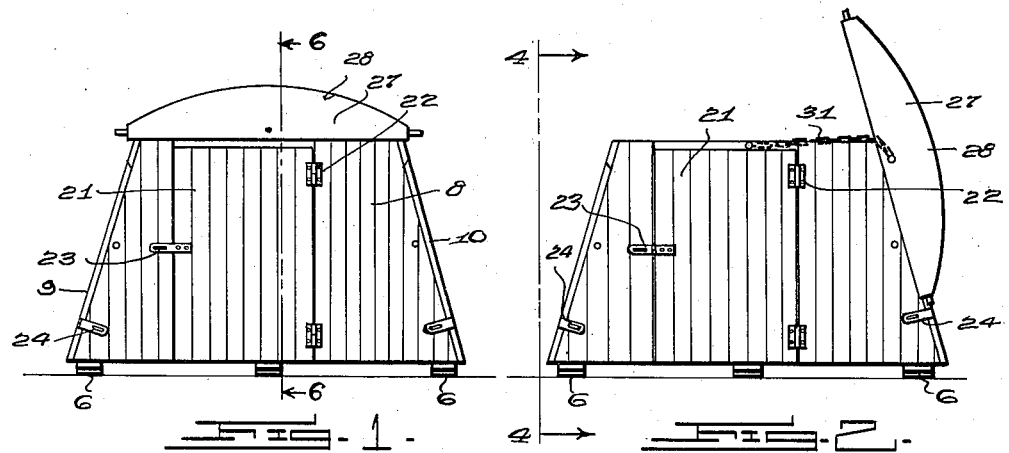
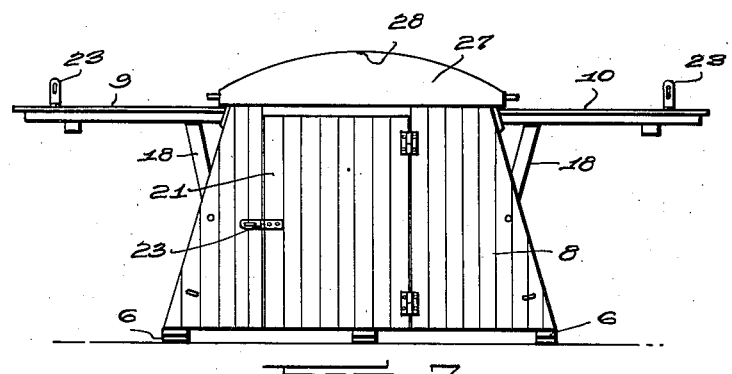
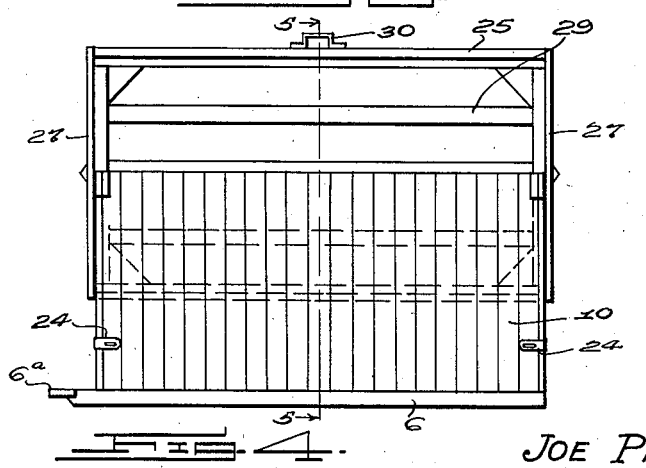
Inventor
JOE PHALEN,
By *Clarence A. O'Brien and Hyman Berman*
Attorneys Sept. 9, 1941.   J. PHALEN   2,255,185
HOG HOUSE
Filed Nov. 26, 1938   2 Sheets-Sheet 2
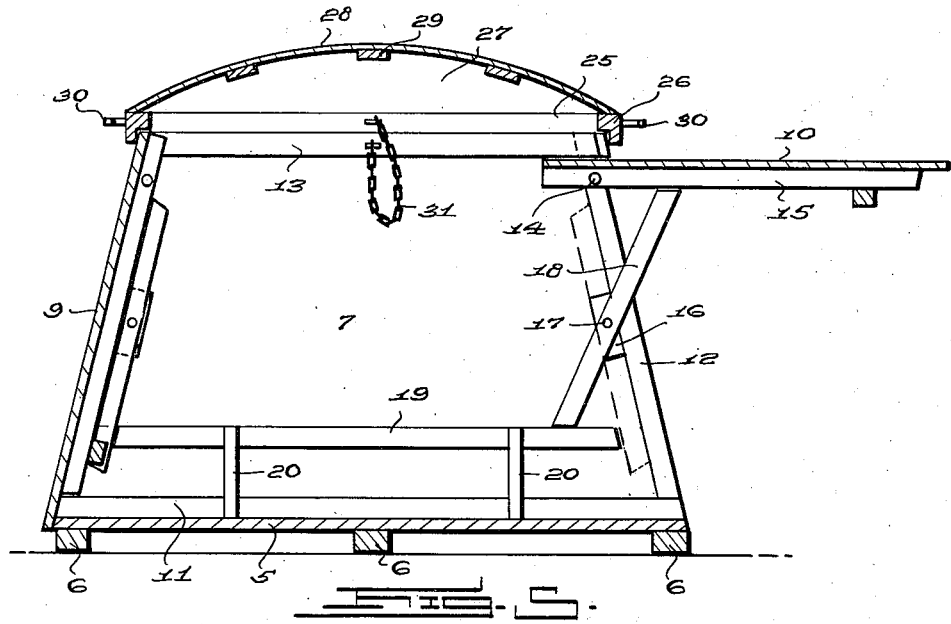
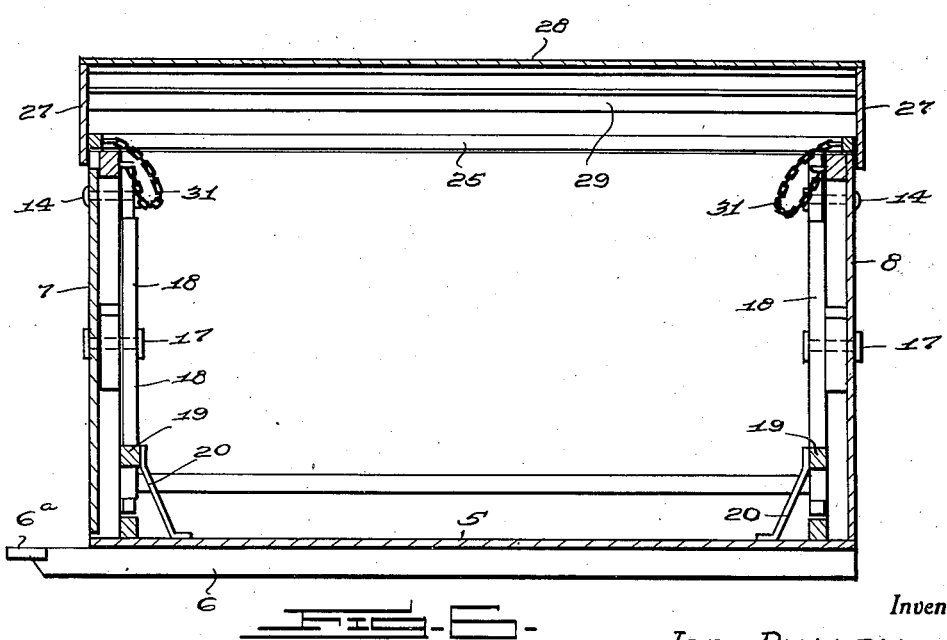
Inventor
JOE PHALEN,
By Clarence A. O'Brien
and Hyman Berman
Attorneys Patented Sept. 9, 1941

2,255,185

UNITED STATES PATENT OFFICE 2,255,185

HOG HOUSE

Joe Phalen, Chatsworth, Ill.

Application November 26, 1938, Serial No. 242,593

1 Claim. (Cl. 119—16)

This invention relates to new and useful improvements in houses for live stock and more particularly to a unique hog house.

The principal object of the present invention is to provide a hog house of such construction as to permit the top to be slipped back to expose the interior of the house and the animals therein to the sunshine.

Another important object of the invention is to provide a hog house constructed to permit certain of its sides to be elevated to promote ventilation of the interior of the house.

These and other important objects and advantages will become apparent to the reader of the following specification:

In the drawings:

Figure 1 represents a side elevational view of the house.

Figure 2 is a side elevational view with the top removed.

Figure 3 is a side elevational view with certain sides elevated.

Figure 4 is a side elevational view of the house looking at one of the elevated sides.

Figure 5 is a section taken substantially on line 5—5 of Figure 4 showing only one of the sides elevated.

Figure 6 is a sectional view on line 6—6 of Figure 1.

Referring to the drawings wherein like numerals designate like parts, it can be seen that the house consists of the floor 5 mounted upon the runners 6 which serve to space the floor 5 from the ground. The house has the end walls 7 and 8 and the swingable upwardly converging side walls 9 and 10. Each end wall 7—8 has the inside frame made up of the lower horizontal runner 11, the upright members 12 and the horizontal upper frame member 13. Pin members 14 extending through the brace members 15 of the swingable sides 9 and 10 serve to swingably mount these walls. These pins 14 may be in the form of bolts which extend through the brace members 15 and through the frame members 12. The inner sides of the walls 7 and 8 have blocks 16 secured in place adjacent the upright frame members 12 and to these are swingably secured as at 17 the props 18. As shown clearly in Figures 5 and 6, horizontally extending rails 19 are provided in spaced parallel relation with respect to the end walls 7 and 8 and are braced by suitable means 20. The doors or swingable side walls 9—10 can be elevated after which the props 18 can be swung to the propping position shown in Figure 5 and by lowering the side walls 9 and 10 downwardly on these props the walls will be retained in elevated position, thus promoting ventilation of the interior of the house. The propping position of the props 18 is established by engagement of the lower ends thereof with the tops of the rails 19. As shown in Figure 1, the end 8 of the house is provided with the door 21 hingedly connected to the wall 8 by hinges 22. Suitable latch means 23 can be employed between the door 21 and the wall 8. Furthermore, suitable hasp and keeper means, with which a padlock can be employed, is denoted by numeral 24, for the swingable side walls 9 and 10.

To permit sunshine to reach the interior of the house, the top can be shifted to the position shown in Figure 2. This top consists of the rectangular-shaped frame 25, rabbeted as at 26 for positive seating position on the upper frame structure 13. This top has the end walls 27, the upper edges of which are of arcuate shape against which the arcuate-shaped roof 28 can be secured. Suitable slats 29 bridge the end walls 27 to serve in supporting the roof 28. The sides of the frame 25 are provided with handles 30—30 to facilitate shifting of the roof to an on or off position with respect to the house proper.

Chains 31 have their inner ends secured to the frame 13 while their outer ends are secured to the frame 25 of the top and obviously the chain serves to prevent the top from reaching the ground when it is shifted off of the top of the house proper.

While the foregoing specification sets forth the invention in specific terms, it is to be understood that numerous changes in the shape, size and materials may be resorted to without departing from the spirit and scope of the invention as claimed hereinafter.

Having described the invention what is claimed as new is:

A hog house comprising a floor, a pair of end walls, a pair of side walls pivoted adjacent the upper edges thereof to the end walls for swinging outwardly and upwardly into substantially horizontal position, a pair of horizontal rails adjacent the end walls, respectively, mounted on said floor in elevated position, and a pair of props for each side wall for propping the same in upwardly swung position, said pairs of props being pivoted on the end walls for swinging into and from propping position and engaging the tops of said rails in the propping position thereof to establish said position.

JOE PHALEN.